US011881670B2

(12) United States Patent
Berghahn

(10) Patent No.: US 11,881,670 B2
(45) Date of Patent: Jan. 23, 2024

(54) CONNECTION TERMINAL

(71) Applicant: Phoenix Contact GmbH & Co. KG, Blomberg (DE)

(72) Inventor: Kevin Berghahn, Blomberg (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 180 days.

(21) Appl. No.: 17/602,796

(22) PCT Filed: Mar. 27, 2020

(86) PCT No.: PCT/EP2020/058750
§ 371 (c)(1),
(2) Date: Oct. 11, 2021

(87) PCT Pub. No.: WO2020/212121
PCT Pub. Date: Oct. 22, 2020

(65) Prior Publication Data

US 2022/0158368 A1 May 19, 2022

(30) Foreign Application Priority Data

Apr. 16, 2019 (DE) ..................... 10 2019 109 975.7

(51) Int. Cl.
*H01R 4/48* (2006.01)

(52) U.S. Cl.
CPC ................................ *H01R 4/48365* (2023.08)

(58) Field of Classification Search
None
See application file for complete search history.

(56) References Cited

U.S. PATENT DOCUMENTS 11,387,580 B2 * 7/2022 Fehling ................ H01R 9/2408

FOREIGN PATENT DOCUMENTS

| | | | |
|---|---|---|---|
| DE | 3237787 | C1 | 3/1984 |
| DE | 102010025930 | A1 | 1/2012 |
| DE | 202014103797 | U1 | 11/2014 |
| DE | 202016007200 | U1 | 9/2017 |
| DE | 202017103185 | U1 | 9/2017 |
| DE | 102016108825 | A1 | 11/2017 |
| DE | 202016104971 | U1 | 12/2017 |
| EP | 2947718 | A1 | 11/2015 |

* cited by examiner

*Primary Examiner* — Ross N Gushi
(74) *Attorney, Agent, or Firm* — LEYDIG, VOIT & MAYER, LTD.

(57) ABSTRACT

A connecting terminal for connecting an electrical conductor is provided. The connecting terminal includes a housing and a conductor insertion opening formed in the housing, via which the conductor to be connected is insertable into the conductor connection chamber along an insertion direction. The connecting terminal also includes a current bar arranged in the conductor connection space of the housing and a clamping spring arranged in the conductor connection chamber and having a retaining leg and a clamping leg. The clamping leg is transferrable into a clamping position and into an open position. The connecting terminal further includes an actuating element, which is arranged displaceably in the housing along an actuating direction. The clamping leg of the clamping spring is actuatable by means of the actuating element in order to transition from the clamping position into the open position.

12 Claims, 3 Drawing Sheets

CONNECTION TERMINAL

CROSS-REFERENCE TO PRIOR APPLICATIONS

This application is a U.S. National Phase application under 35 U.S.C. § 371 of International Application No. PCT/EP2020/058750, filed on Mar. 27, 2020, and claims benefit to German Patent Application No. DE 10 2019 109 975.7, filed on Apr. 16, 2019. The International Application was published in German on Oct. 22, 2020 as WO 2020/212121 under PCT Article 21(2).

FIELD

The invention relates to a connecting terminal for connecting an electrical conductor, comprising a housing in which a conductor connection chamber is formed, a conductor insertion opening formed in the housing, a current bar arranged in the conductor connection chamber of the housing via which the conductor to be connected can be inserted into the conductor connection chamber along an insertion direction, a clamping spring arranged in the conductor connection chamber and having a retaining foot and a clamping foot, wherein the clamping foot can be transferred into a clamping position and into an open position, and an actuating element which is movable in the housing along an actuating direction, wherein the clamping foot of the clamping spring can be actuated by means of the actuating element in order to transfer from the clamping position into the open position.

BACKGROUND

Such connecting terminals typically have a leg spring having a retaining leg and a clamping leg, wherein a conductor inserted into the connecting terminal can be clamped against the bus bar by means of the clamping leg. If, in particular, flexible conductors are clamped, the clamping spring must already be actuated by means of the actuating element prior to insertion of the conductor in order to pivot the clamping spring or the clamping leg away from the bus bar so that the conductor can be inserted into the intermediate space between the bus bar and the clamping spring. Only with rigid and thus stable conductors can the conductor apply sufficient force to the clamping spring or the clamping leg of the clamping spring in order to be able to pivot the clamping leg away from the bus bar without the actuating element having to be actuated by a user for this purpose. With flexible conductors, the user must first pivot the clamping spring away from the bus bar by actuating the actuating element so that the flexible conductor can be inserted and clamped. Actuating the actuating element by the user makes mounting or connecting the conductor difficult for the user, since handling is cumbersome and the time required increases as well.

SUMMARY

In an embodiment, the present invention provides a connecting eterminal for connecting an electrical conductor, comprising: a housing within which a conductor connection chamber is formed, a conductor insertion opening formed in the housing, via which the conductor to be connected is insertable into the conductor connection chamber along an insertion direction, a current bar arranged in the conductor connection space of the housing, a clamping spring arranged in the conductor connection chamber and having a retaining leg and a clamping leg, wherein the clamping leg is transferrable into a clamping position and into an open position, and an actuating element, which is arranged displaceably in the housing along an actuating direction, wherein the clamping leg of the clamping spring is actuatable by means of the actuating element in order to transition from the clamping position into the open position, wherein the actuating direction of the actuating element is formed transversely to the insertion direction of the conductor into the conductor connection chamber, and a retaining element is arranged in the conductor connection chamber of the housing, on which retaining element the clamping leg is held in the open position and from which the clamping leg is released in the clamping position, wherein the retaining element has a pressure surface which is arranged transversely to the insertion direction of the conductor and which is actuatable by means of the conductor to be connected in order to release the clamping leg from the retaining element for transfer from the open position into the clamping position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
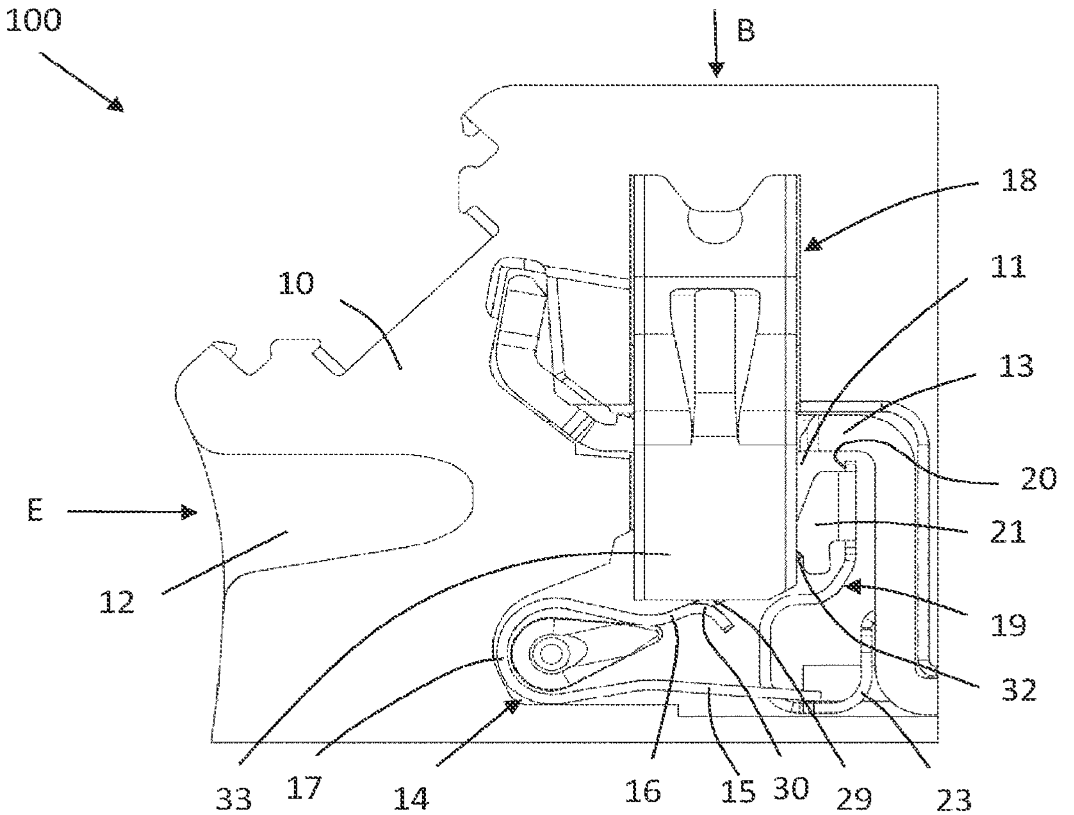
FIG. 1 a schematic illustration of a connecting terminal according to the invention with a clamping leg of a clamping spring in an open position, FIG. 2 a schematic perspective view of the connecting terminal shown in FIG. 1 while inserting a conductor into the housing of the connecting terminal, FIG. 3 a schematic representation of a plan view of a longitudinal side of the connecting terminal shown in FIG. 2 while inserting the conductor, FIG. 4 a schematic representation of the connecting terminal with the clamping leg of the clamping spring in a clamping position, FIG. 5 a schematic representation of the connecting terminal without a housing with the clamping leg of the clamping spring in the open position, and FIG. 6 a schematic representation of the connecting terminal without a housing with the clamping leg of the clamping spring in the clamping position without inserted conductors.
Figure 2:
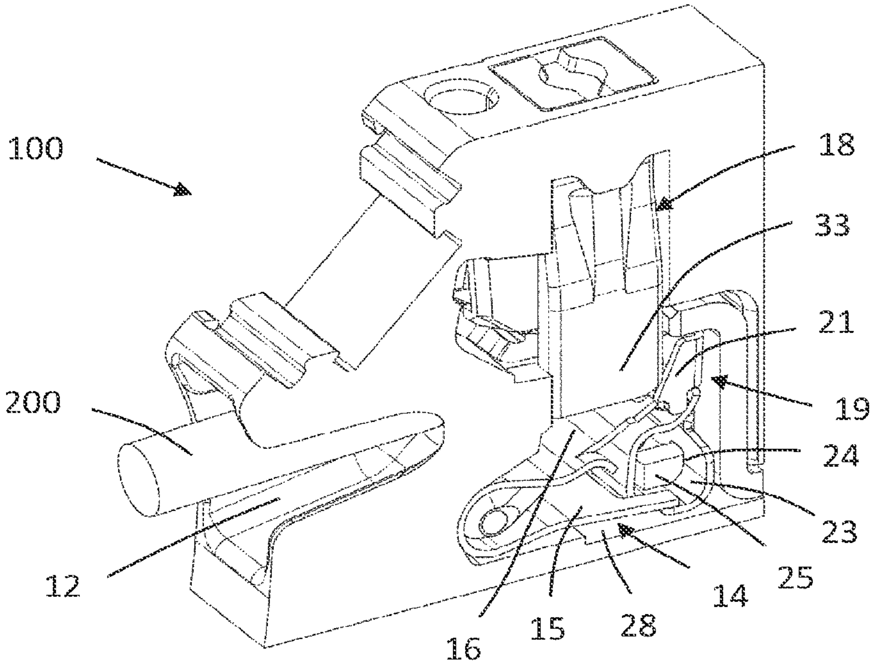
Figure 3:
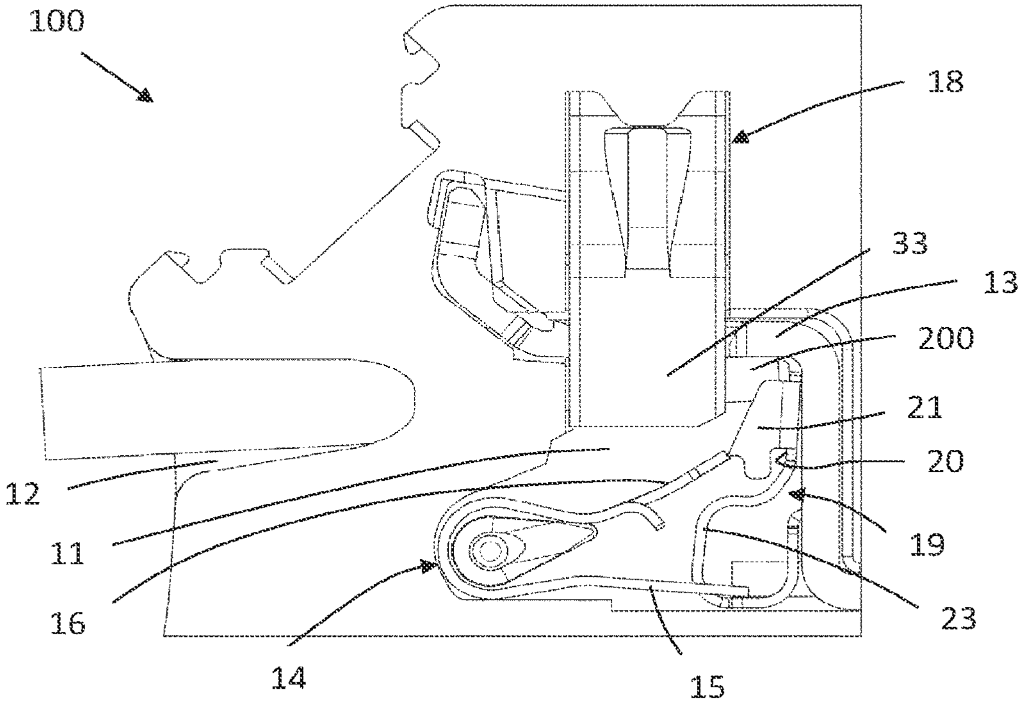

In an embodiment, the present invention provides an electrical connecting clamp in which the connection of, in particular, flexible conductors can be simplified.

The connecting terminal according to the invention is characterized in that the actuating direction of the actuating element is designed transverse to the insertion direction of the conductor in such a way that a retaining element is arranged in the conductor connection chamber of the housing on which the clamping leg is held in the open position and from which the clamping leg is released in the clamping position, wherein the retaining element has a pressure surface which is arranged transversely to the insertion direction of the conductor and which can be actuated by means of the conductor to be connected in order to release the clamping leg from the retaining element for transfer from the open position into the clamping position.

By means of the connecting terminal according to the invention, a flexible conductor can now also be connected in the connecting terminal without the actuation of the actuating element and clamped against the bus bar. The clamping spring is designed as a leg spring which has a retaining leg and a clamping leg designed to be pivoted relative to the retaining leg. By means of a pivoting movement of the clamping leg, the clamping leg can be inserted into an open position, in which the clamping leg is arranged at a distance from the current bar and a subsequent intermediate space formed thereby can be inserted between the current bar and the clamping leg, or can be guided out of it, and can be transferred into a clamping position in which the clamping leg can bear against the current bar or against the connected conductor in order to clamp the conductor against the current bar. The connecting terminal has a retaining element on which the clamping spring with its clamping leg is held in the open position in such a way that, in particular, a flexible conductor can be inserted into the intermediate space formed thereby between the current bar and the clamping spring without the clamping spring or the clamping leg of the clamping spring having to be actuated beforehand with the actuating element. The retaining element has a pressure surface which is arranged in the insertion region of the conductor into the connecting terminal and thus in the extension of the conductor insertion opening, so that the conductor abuts the pressure surface when inserted into the connecting terminal. By applying a compressive force by means of the conductor to the pressure surface, the retaining element can be brought into a pivoting movement or tilting movement in the direction of the insertion direction of the conductor so that the retaining element can be pivoted or tilted away from the clamping leg in the insertion direction of the conductor. Due to the pivoting movement of the retaining element, the clamping spring can be released from the retaining element so that the clamping spring with its clamping leg can move, in particular pivot, in the direction of the inserted conductor, and thereby can clamp the inserted conductor against the current bar. By means of this special mechanism, a flexible conductor can be particularly easily connected by the insertion movement of the conductor alone, without a user having to actuate further elements, such as the actuating element, on the connecting terminal. This facilitates the handling of the connecting terminal and saves time when connecting a conductor. In order to release the conductor to be connected from the clamping position again, the clamping leg of the clamping spring can be pivoted back in the direction of the retaining element by means of the actuating element and securely fixed, in particular latched, to the retaining element position so that the clamping leg is in the open position again. The retaining element is preferably an element or component which is formed separately from the clamping spring and the current bar and which can be arranged in the conductor connection space of the housing of the terminal. The connecting terminal is constructed in such a way that the actuating direction of the actuating element is formed transversely to the insertion direction of the conductor. A channel in the housing in which the actuating element is guided is thus preferably formed transversely or perpendicularly to the conductor insertion opening formed in the housing. As a result, the conductor can be inserted over a side surface of the housing on which the actuating element is not positioned so that an inadvertent actuation of the actuating element when connecting and thus when inserting the conductor into the housing can be avoided.

In order to facilitate the pivoting movement or tilting movement of the retaining element when a compressive force of the conductor to be connected to the pressing surface of the retaining element is applied, the retaining element can be designed to be spring-elastic at least in some regions. As a result of a spring elasticity of the retaining element at least in some regions, the compressive force to be exerted by the conductor on the pressure surface in order to release the clamping leg from the latching with the retaining element can be reduced. In particular, flexible conductors with a small conductor cross-section can thereby also be securely connected with simple handling. The retaining element is preferably designed to be resilient in a region, which is arranged outside the pressure surface, so that the pressure surface can be designed to be sufficiently dimensionally stable even in case of a spring elasticity of the retaining element.

In order for the clamping leg to be securely held on the retaining element in the open position, the retaining element preferably has two oppositely positioned latching faces on which the clamping leg of the clamping spring can be held in the open position, wherein the latching faces can each be arranged transversely to the pressure face of the retaining element. The latching surfaces may each be formed on a type of latching wing, which may be formed on longitudinal side surfaces of the pressure surface. The two latching surfaces form a U-shaped cross-section of the holding element with the pressure surface. When the pressure surface is actuated with the conductor to be connected, the conductor is guided along between the two latching surfaces in order to reach the pressure surface. The two latching surfaces thus protrude from the pressure surface in the direction of the conductor insertion opening, so that the clamping leg can be held on the retaining element via the latching faces at a distance to the pressure face. In the open position, the clamping leg can latch behind the two latching surfaces or behind hooks in order to be held on the retaining element. Due to the two latching surfaces, which preferably run in parallel to one another, a particularly secure holding of the clamping leg can take place at two points of the clamping leg spaced apart from one another, so that a tilting of the clamping leg and thus an undesired release of the clamping leg from the retaining element or from the latching faces of the retaining element can be prevented.

The retaining element can be attached to the clamping spring and/or to the current bar. The retaining element, which is preferably designed as a component separate from the clamping spring and also from the current bar, can thus be supported on the clamping spring and/or on the current bar and held in its position. The retaining element is particularly preferably held on the clamping spring and on the current bar so that a particularly stable arrangement of the retaining element relative to the clamping spring and relative to the current bar is possible.

The retaining element preferably has a retaining bar by means of which the retaining element can be attached to the clamping spring and/or the current bar, wherein the pressure surface can be formed at a first free end of the retaining bar. The retaining bar is preferably designed in an arc shape. The holding bar can be designed to be spring-elastic at least in some regions, so that the retaining element can be designed to be spring-elastic in regions via the retaining bar. The pressure surface can directly connect to the retaining bar. A fastening of the retaining element to the clamping spring and/or to the current bar, which is at a distance from the pressure surface, can be formed by the retaining bar so that the function of the pressure surface is not influenced by the fastening of the retaining element.

If the retaining element is attached to the current bar, it can be provided in such a way that the retaining bar has a window-like opening through which a partial region of the current bar can protrude. The current bar may have a type of retaining lug which can project through the window-like opening of the retaining bar.

Furthermore, it may be possible for the holding bar to have at a second free end a latching lug which can engage in a recess formed on the current bar. The retaining bar can be hooked onto the current bar by means of the latching lug.

Furthermore, it is possible for the retaining leg of the clamping spring to rest on the retaining bar of the retaining element at least in regions. By means of the retaining leg of the clamping spring, the retaining bar of the retaining element can be pressed against the housing or against an interior wall of the housing so that the retaining bar and thus the retaining element can be held or fixed between the clamping spring and the housing or the interior wall of the housing. The retaining element can thus be fastened via the retaining leg of the clamping spring.

The clamping leg of the clamping spring can be designed in such a way that it can have a clamping bracket and at least one lateral bracket arranged to the side of the clamping bracket, wherein a clamping edge for clamping the conductor against the current bar can be formed at a free end of the clamping bracket, wherein the clamping leg can be held on the holding element via the clamping bracket in the open position, and wherein the actuating element can interact with the lateral bracket in order to actuate the clamping leg. The actuation of the clamping leg by means of the actuation element can thus take place via a side tab of the clamping leg, which is provided in addition to the clamping tab of the clamping leg on which the clamping edge is formed. The function of actuating the clamping leg by means of the actuating element can thus be separated from the clamping of the conductor to be connected via the clamping bracket of the clamping leg. The lateral tab preferably runs parallel to the clamping bracket. The lateral tab preferably forms an outer edge of the clamping leg. A free space or gap is preferably formed between the lateral bracket and the clamping bracket, so that the lateral bracket is preferably formed at a distance from the clamping bracket, wherein it is preferably integrally connected to the clamping bracket at a free end of the lateral bracket.

The clamping leg can have a second lateral bracket arranged to the side of the clamping bracket, wherein the clamping bracket can be positioned between the first lateral bracket and the second Lateral bracket. The clamping leg of the clamping spring can thus be designed symmetrically with both lateral brackets and the clamping bracket. The clamping leg can thus be acted upon by the actuating element on both sides of the clamping tab via the two lateral brackets during an actuation process, so that a particularly uniform distribution of force on the clamping leg of the clamping spring can be achieved.

In relation to the one or the two lateral brackets, the clamping bracket is preferably formed in such a way that the clamping bracket can project beyond the at least one lateral bracket in the longitudinal direction of the clamping leg. The actuation surface of the actuating element formed by the lateral bracket can thus be set back on the clamping leg in relation to the clamping edge of the clamping leg in the direction of the bending joint of the clamping spring which connects the clamping leg to the retaining leg.

The actuating element preferably has at least one actuating finger by means of which the actuating element can actuate the clamping leg. The actuation finger preferably interacts with the lateral bracket of the clamping leg. The actuating finger thus preferably forms an outer side or an exterior wall of the actuating element.

The actuating element preferably has two oppositely arranged actuating fingers for actuating the clamping leg of the clamping spring, wherein a free space for passing the conductor to be connected can be formed between the two actuating fingers. If the clamping leg has two lateral brackets, a first actuation finger of the actuating element can interact with a first lateral bracket and a second actuation finger of the actuating element can interact with the second lateral bracket. As a result of the two actuating fingers, the actuating element can have a U-shape, wherein an opening in the form of the free space can be formed by the two actuating fingers arranged at a distance from one another, through which opening the conductor to be connected and in particular also a subregion of the current bar can be guided. The two actuating fingers can thus prevent a lateral misalignment of the conductor to be connected both to the right and to the left. The two actuating fingers are preferably designed symmetrically to one another. The two actuating fingers are preferably designed to be long in the actuation direction of the actuating element in such a way that they, at any point in time, in particular in the open position and in the clamping position of the clamping leg of the clamping spring, laterally overlap the conductor inserted into the housing and into the conductor connection space, so that the actuating fingers form a guide and lateral boundary for the conductor to be connected at any point in time.

Figure 5:
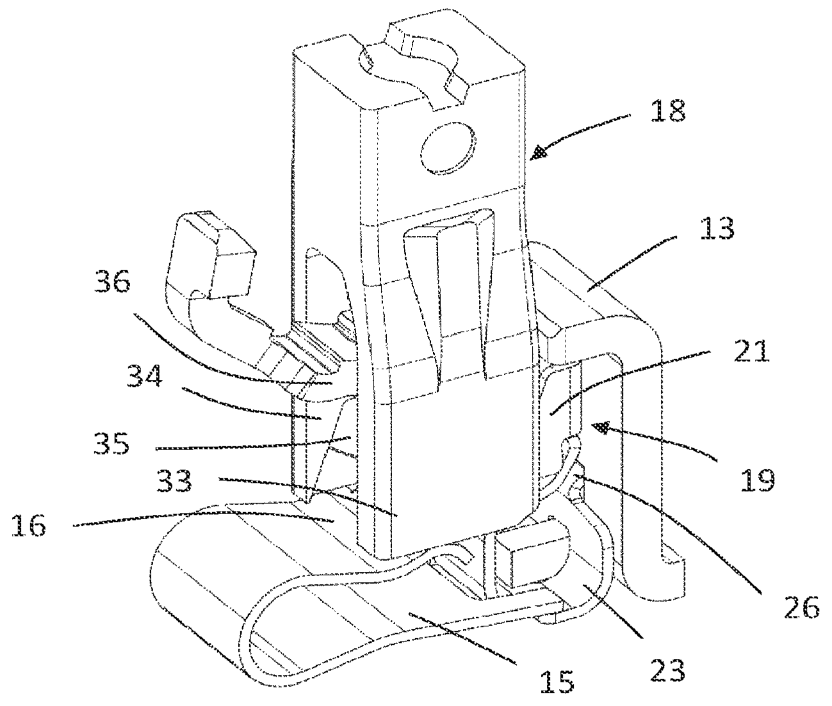
Figure 6:
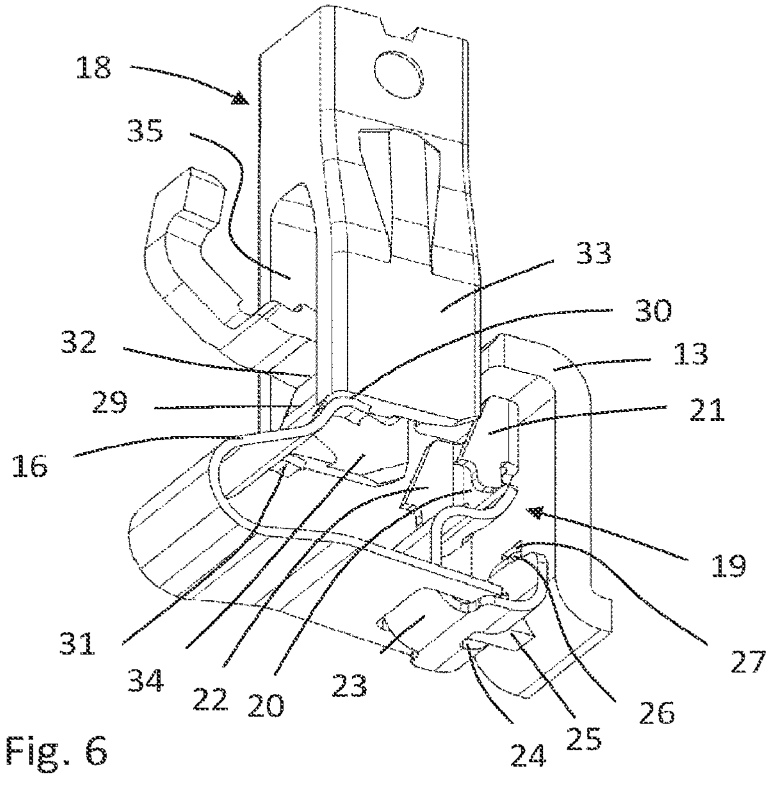

FIGS. 1 to 4 show a connecting terminal 100 for connecting an electrical conductor 200. The connecting terminal 100 has a housing 10 which can be made of an insulating material. FIGS. 5 and 6 show the connecting terminal 100 without such a housing 10.

A conductor connection chamber 11 is formed In the housing 10, within which a conductor 200 inserted into the housing 10 can be clamped and thus electrically connected. For inserting the conductor 200 into the conductor connection chamber 11, the housing 10 has a conductor insertion opening 12 which opens into the conductor connection chamber 11. The conductor 200 to be connected can be inserted into the conductor connection chamber 11 along an insertion direction E via the conductor insertion opening 12.

Arranged In the conductor connection chamber 11 of the housing 10 is a current bar 13 against which the conductor 200 to be connected can be clamped in order to electrically connect the conductor 200. In order to clamp the conductor 200 to be connected against the current bar 13, a clamping spring 14 is also arranged in the conductor connection chamber 11.

The clamping spring 14 is designed as a leg spring. The clamping spring 14 has a retaining leg 15, a clamping leg 16 and an arc-shaped bending joint 17, wherein the bending joint connects the retaining leg 15 to the clamping leg 16. The retaining leg 15 is arranged in the housing 11 in a fixed position. In contrast, the clamping leg 16 is movable, in particular pivotable, relative to the retaining leg 15. The clamping leg 16 can be moved by its pivotability into an open position and into a clamping position.

In the open position, as shown in FIGS. 1, 2, 3 and 5, the clamping leg 16 is pivoted away from the current bar 13 so that a free space is formed between the clamping leg 16 and the current bar 13 into which a conductor 200 to be connected can be inserted.

Figure 4:
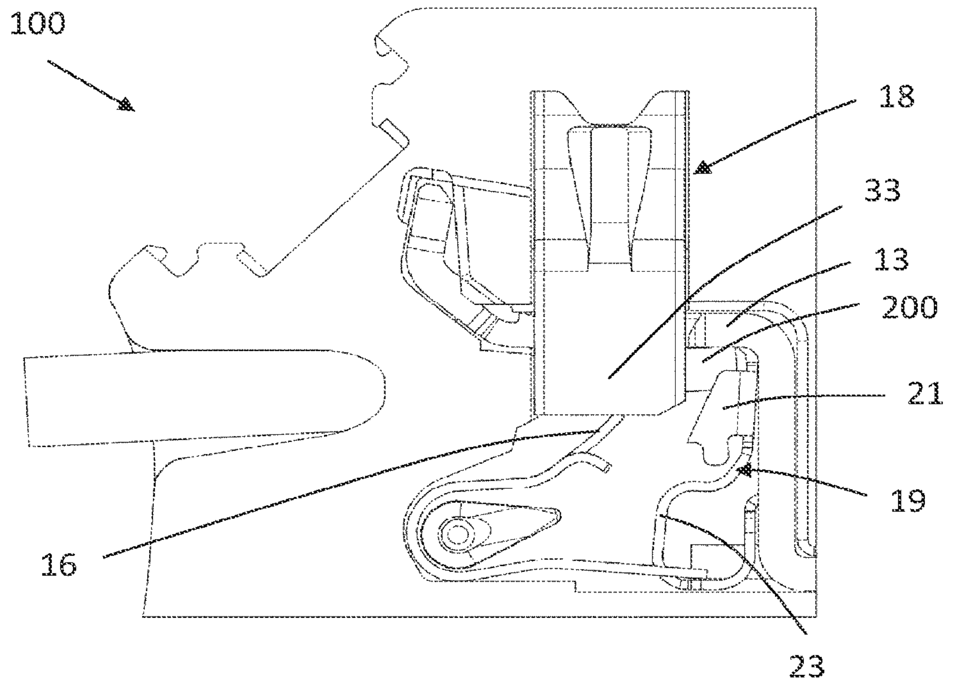

FIGS. 4 and 6, a clamping position of the clamping leg 16 is shown, in which the clamping leg 16 itself bears against the current bar 13 if no conductor 200 is inserted into the conductor connection chamber 11, and if the conductor 200 is inserted, the clamping leg 16 presses or clamps the conductor 200 against the current bar 13.

For transferring the clamping leg 16 from the clamping position into the open position, an actuating element 18 is provided which is displaceably mounted in the housing 10 along an actuating direction B. When the clamping leg 16 is actuated, the actuating element 18 presses from above onto the clamping leg 16 of the clamping spring 14.

Furthermore, a retaining element 19 is arranged in the housing 10 and holds the clamping leg 16 of the clamping spring 14 in its open position. For this purpose, the clamping leg 16 can hook or latch behind the retaining element 19. The retaining element 19 has a pressure surface 20 which extends transversely or perpendicularly to the insertion direction E of the conductor 200 into the housing 10. When the conductor 200 is inserted into the conductor connection chamber 11, the conductor 200 presses against the pressure surface 20 if it is inserted far enough so that the retaining element 19 is moved away from the clamping leg 16 of the clamping spring 14 and thereby the latching or rear latching of the clamping leg 16 on the retaining element 19 is released so that the clamping leg 16 can automatically pivot from the open position into the clamping position in order to be able to clamp the inserted conductor 200 against the current bar 13. The pressure surface 20 is arranged in alignment with the conductor insertion opening 12 and thus in the extension of the conductor insertion opening 12 so that when the conductor 200 is inserted into the conductor connection chamber 11, the conductor 200 is guided toward the pressure surface 20 of the retaining element 19 via the conductor insertion opening 12.

For latching or latching behind the clamping leg 16 of the clamping spring 14 on the retaining element 19 in the open position, the retaining element 19 has two latching surfaces 21, 22 arranged opposite one another, as shown in particular in FIG. 6. The two latching surfaces 21, 22 extend parallel to one another. The two latching surfaces 21, 22 are arranged here transversely or at a 90° angle to the pressure surface 20. However, the latching surfaces 21, 22 may also be arranged at an angle greater than or less than 90° to the pressure surface 20. For example, the latching surfaces 21, 22 may be arranged at an angle between 70° and 120°, preferably between 80° and 110° to the pressure surface 20. The latching surfaces 21, 22 are each formed on a type of latching wing, which are formed on longitudinal side surfaces of the pressure surface 20. The two latching surfaces 21, 22 form a U-shaped cross-section with the pressure surface 20. For actuating the pressure surface 20 by means of the conductor 200 to be connected, the conductor 200 is guided along between the two latching surfaces 21, 22 in order to reach the pressure surface 20. The two latching surfaces 21, 22 thus protrude from the pressure surface 20 so that the clamping leg 16 can be held on the retaining element 19 at a distance from the pressure surface 20.

In this case, the retaining element 19 is designed to be resilient at least in regions in order to be able to achieve a pivoting of the pressure surface 20 when a conductor 200 presses against the pressure surface 20. The resilience is realized by an elongated retaining bar 23 of the retaining element 19. The retaining bar 23 is designed with an arc. The retaining bar 23 is curved in half an S shape.

In addition to the design of the resilience of the retaining element 19, a fastening of the retaining element 19 in the housing 10 of the connecting terminal 100 can also be formed via the retaining bar 23. In the embodiment shown here, the retaining element 19 is held or fastened to the clamping spring 14 and also to the current bar 13 via its retaining bar 23.

The retaining bar 23 adjoins the pressure surface 20 in that the pressure surface 20 is integrally formed at a first free end of the retaining bar 23.

In order to fasten the retaining element 19 to the current bar 13, a window-like opening 24 is formed in the retaining bar 23, through which opening a subregion of the current bar 13 in the form of a retaining lug 25 of the current bar 13 projects. The retaining element 19 is thus suspended from the current bar 13 or from the retaining lug 25 of the current bar. In addition, the retaining element 19 is attached to the current bar 13 in that a latching lug 26 is formed at a second free end of the retaining bar 23 and engages in a recess 27 formed on the current bar 13, as shown in particular in FIGS. 5 and 6. In the embodiment shown here, the retaining element 19 is thus held or fastened at two different locations and in two different ways to the current bar 13.

Furthermore, the retaining element 19 is also held in a fixed and stable position here via the clamping spring 14. In order to achieve this, the retaining leg 15 of the clamping spring 14 rests on the retaining bar 23 at least partially. A subregion of the retaining bar 23 and thus a subregion of the retaining element 19 is thus arranged between the clamping spring 14 and the interior wall 28 of the housing 10 delimiting the conductor connection chamber 11.

The clamping leg 16 of the clamping spring 14 has a clamping bracket 29 and two lateral brackets 30, 31 arranged to the side of the clamping bracket 29. The clamping bracket 29 is arranged between the two lateral brackets 30, 31. A clamping edge 32 is formed at a free end of the clamping bracket 29, by means of which the clamping leg 16 and thus the clamping bracket 29 bears against the current bar 13 or on the connected conductor 200 in the clamping position. In the open position, the clamping leg 16 locks or latches behind the clamping bracket 29 on the holding element 19 or on the latching surfaces 21, 22 of the holding element 19 by the clamping bracket 29 hooking behind the clamping edge 32 on the latching surfaces 21, 22.

By contrast, the clamping leg 16 of the clamping spring 14 is actuated by the actuating element 18 via the two lateral brackets 30, 31, which run parallel to the clamping bracket 29, by applying a compressive force to the two lateral brackets 30, 31 in the actuating direction B. Preferably, no compressive force is applied to the clamping bracket 29 by the actuating element 18.

The clamping bracket 29 is designed to be substantially longer than the two lateral brackets 30, 31 so that the clamping bracket 29 projects beyond the two lateral brackets 30, 31 in the longitudinal direction of the clamping leg 16.

The actuating element 18 has two actuating fingers 33, 34 which are arranged parallel to one another and each of which interacts with the two lateral brackets 30, 31. As a result of the two actuating fingers 33, 34, the actuating element 18 has a U-shape, wherein an opening in the form of a free space 35 is formed through the two actuating fingers 33, 34 arranged at a distance from one another, through which opening the conductor 200 to be connected and also a subregion 36 of the current bar 13 is guided. The clamping bracket 29 of the clamping leg 16 also dips into the free space 35 between the two actuation fingers 33, 34.

The two actuating fingers 33, 34 can prevent a lateral misalignment of the conductor 200 to be connected both to the right and to the left of the current bar 13. For this purpose, the two actuation fingers 33, 34 are designed to be sufficiently long in the actuation direction B of the actuation element 18 so that they are movable at any point in time, particularly in the open position and in the clamping position of the clamping leg 16 of the clamping spring 14, laterally overlap the conductor 200 inserted into the housing 10 and into the conductor connection chamber 11 so that the actuating fingers 33, 34 form a guide and lateral boundary for the conductor 200 to be connected at any point in time, as shown in particular in FIGS. 2, 3 and 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connecting terminal
10 Housing
11 Conductor connection chamber
12 Conductor insertion opening
13 Current bar
14 Clamping spring
15 Retaining leg
16 Clamping leg
17 Bending joint
18 Actuating element
19 Retaining element
20 Pressure surface
21 Latching surface
22 Latching surface
23 Retaining bar
24 Opening
25 Retaining lug
26 Latching lug
27 Recess
28 Interior wall
29 Clamping bracket
30 Lateral bracket
31 Lateral bracket
32 Clamping edge
33 Actuating finger
34 Actuating finger
35 Free space
36 Subregion
200 Conductor
B Actuating direction
E Insertion direction

The invention claimed is:

1. A connecting terminal for connecting an electrical conductor, the connecting terminal comprising:
- a housing within which a conductor connection chamber is formed;
- a conductor insertion opening formed in the housing, via which the electrical conductor to be connected is insertable into the conductor connection chamber along an insertion direction;
- a current bar arranged in the conductor connection space of the housing;
- a clamping spring arranged in the conductor connection chamber and having a retaining leg and a clamping leg, wherein the clamping leg is transferrable into a clamping position and into an open position; and
- an actuating element, which is arranged displaceably in the housing along an actuating direction,
- wherein the clamping leg of the clamping spring is actuatable by the actuating element in order to transition from the clamping position into the open position,
- wherein the actuating direction of the actuating element is formed transversely to the insertion direction of the conductor into the conductor connection chamber, and a retaining element is arranged in the conductor connection chamber of the housing, on which retaining element the clamping leg is held in the open position and from which the clamping leg is released in the clamping position,
- wherein the retaining element has a pressure surface which is arranged transversely to the insertion direction of the conductor and which is actuatable by means of the conductor to be connected in order to release the clamping leg from the retaining element for transfer from the open position into the clamping position, and
- wherein the retaining element is fastened to the clamping spring or to the current bar.

2. The connecting terminal according to claim 1, wherein the retaining element has spring elastic properties.

3. The connecting terminal according to claim 1, wherein the retaining element has two oppositely arranged latching faces on which the clamping leg of the clamping spring is held in the open position, wherein the latching surfaces are each arranged transversely to the pressure surface of the retaining element.

4. The connecting terminal according to claim 1, wherein the actuating element has two opposite actuating fingers for actuating the clamping leg of the clamping spring, and
- wherein a free space for conducting the conductor to be connected is formed between the two actuating fingers.

5. The connecting terminal according to claim 1, wherein the retaining element has a retaining bar by which the retaining element is attached to the clamping spring or to the current bar, and
- wherein the pressure surface is formed at a first free end of the retaining bar.

6. The connecting terminal according to claim 5, wherein the retaining bar has a window-like opening through which a subregion of the current bar projects.

7. The connecting terminal according to claim 5, wherein the retaining bar has at a second free end a latching lug that engages in a recess formed on the current bar.

8. The connecting terminal according to claim 5, wherein the retaining leg of the clamping spring rests at least partially on the retaining bar.

9. The connecting terminal according to claim 8, wherein the clamping leg has a clamping bracket and at least one lateral bracket arranged to the side of the clamping bracket, wherein a clamping edge for clamping the conductor against the current bar is formed at a free end of the clamping bracket, wherein the clamping leg is held in the open position on the holding element via the clamping bracket, and wherein the actuating element interacts with the lateral bracket to actuate the clamping leg.

10. The connecting terminal according to claim 9, wherein the clamping bracket projects beyond the at least one lateral bracket in the longitudinal direction of the clamping leg.

11. A connecting terminal for connecting an electrical conductor, the connecting terminal comprising:

a housing within which a conductor connection chamber is formed;

a conductor insertion opening formed in the housing, via which the electrical conductor to be connected is insertable into the conductor connection chamber along an insertion direction;

a current bar arranged in the conductor connection space of the housing;

a clamping spring arranged in the conductor connection chamber and having a retaining leg and a clamping leg, wherein the clamping leg is transferrable into a clamping position and into an open position; and an actuating element, which is arranged displaceably in the housing along an actuating direction, wherein the clamping leg of the clamping spring is actuatable by the actuating element in order to transition from the clamping position into the open position, wherein the actuating direction of the actuating element is formed transversely to the insertion direction of the conductor into the conductor connection chamber, and a retaining element is arranged in the conductor connection chamber of the housing, on which retaining element the clamping leg is held in the open position and from which the clamping leg is released in the clamping position, wherein the retaining element has a pressure surface which is arranged transversely to the insertion direction of the conductor and which is actuatable by means of the conductor to be connected in order to release the clamping leg from the retaining element for transfer from the open position into the clamping position, and wherein the retaining element has spring elastic properties.

12. A connecting terminal for connecting an electrical conductor, the connecting terminal comprising:

a housing within which a conductor connection chamber is formed;

a conductor insertion opening formed in the housing, via which the electrical conductor to be connected is insertable into the conductor connection chamber along an insertion direction;

a current bar arranged in the conductor connection space of the housing;

a clamping spring arranged in the conductor connection chamber and having a retaining leg and a clamping leg, wherein the clamping leg is transferrable into a clamping position and into an open position; and an actuating element, which is arranged displaceably in the housing along an actuating direction, wherein the clamping leg of the clamping spring is actuatable by the actuating element in order to transition from the clamping position into the open position, wherein the actuating direction of the actuating element is formed transversely to the insertion direction of the conductor into the conductor connection chamber, and a retaining element is arranged in the conductor connection chamber of the housing, on which retaining element the clamping leg is held in the open position and from which the clamping leg is released in the clamping position, wherein the retaining element has a pressure surface which is arranged transversely to the insertion direction of the conductor and which is actuatable by means of the conductor to be connected in order to release the clamping leg from the retaining element for transfer from the open position into the clamping position, and wherein the retaining element has two oppositely arranged latching faces on which the clamping leg of the clamping spring is held in the open position, wherein the latching surfaces are each arranged transversely to the pressure surface of the retaining element.

* * * * *